Oct. 16, 1962 J. A. TOURTELLOT 3,059,065

STEREOPHONIC SIGNAL TRANSLATING CIRCUITS

Filed Aug. 5, 1958 2 Sheets-Sheet 1

INVENTOR.
JOHN A. TOURTELLOT

BY H. C. Newton

ATTORNEY

INVENTOR.
JOHN A. TOURTELLOT
BY
H. L. Newton
ATTORNEY

United States Patent Office 3,059,065
Patented Oct. 16, 1962

3,059,065

STEREOPHONIC SIGNAL TRANSLATING CIRCUITS

John A. Tourtellot, Merchantville, N.J., assignor to Radio Corporation of America, a corporation of Delaware Filed Aug. 5, 1958, Ser. No. 753,360
10 Claims. (Cl. 179—100.4)

Figure 1:
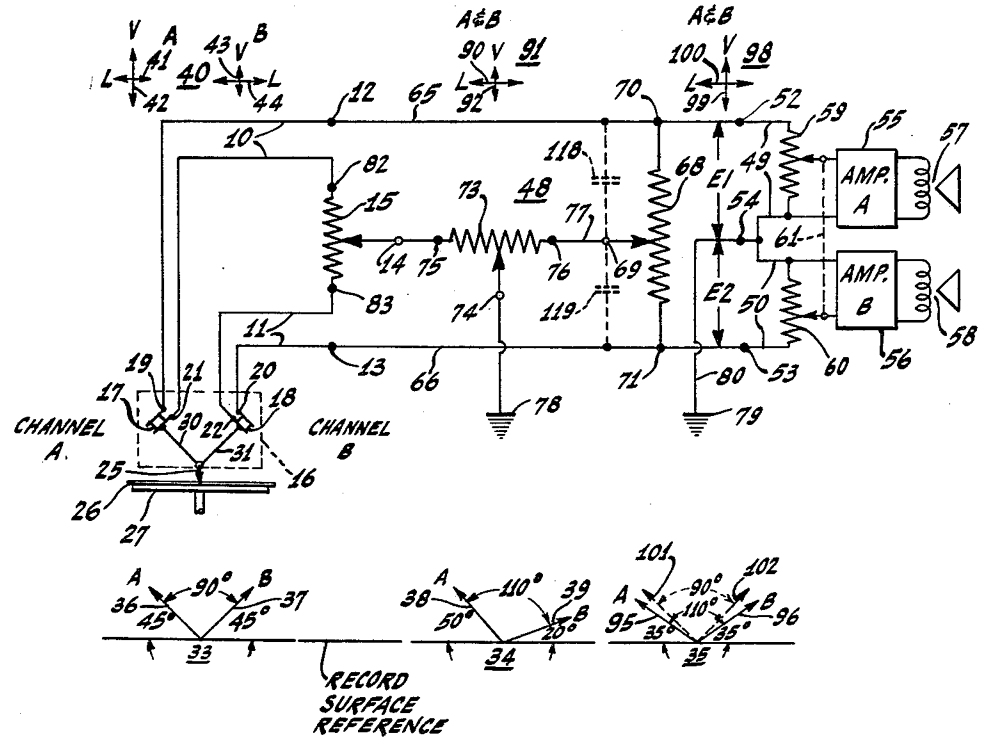

The present invention relates to stereophonic signal translating systems of the dual-channel type wherein two stereophonically related audio-frequency signals are conveyed in separate signal channels, and has for its primary object to provide a dual-channel signal-translating circuit for use in stereophonic signal translating systems of that type for controlling certain electrical components of the translated stereophonic signals and balancing or equalizing the stereophonic signal output of the system.

The present invention relates more particularly to signal translating circuits for stereophonic phonograph systems wherein signal translation and amplification is provided for two stereophonically-related audio-frequency signals which are recorded in, or reproduced from the same record groove. The two signals are recorded generally along axes of modulation which are at a right angle to each other, and at the same angle, such as 45°, to the record surface. Stereophonic records of this type represent a present standard for the industry and will be referred to as 45–45 stereo records herein. The resultant complex groove modulation may be considered to have, or be composed of, vertical and lateral undulation components, in predetermined amplitude relation, which are imparted to, or produced by, a single vertical and laterally movable stylus element mechanically or operatively connected with two separate and duplicate transducing elements in a pickup or a record cutter, for the system.

The transducing elements generally have the same angular operating relation to the stylus along the two axes of modulation, and provide selective signal translation of the two stereophonically related groove recordings to, or from, the two signal channels of the stereo system. These transducing elements, for record reproduction can be connected with the signal channels in polarity relation such that the vertical undulation components of the groove modulation produce vertical signal components which are in-phase or out-of-phase in the two signal channels, and the lateral undulation components of the groove modulation product lateral signal components which are correspondingly out-of-phase or in-phase, respectively, in the two signal channels. Presently, the two signal channels in a phonograph record playing system, for example, normally operate in-phase for the lateral signal components and out of phase for the vertical signal components of the two stereophonic signals translated therethrough. Reversal of the polarity of the connection to one transducer element provides a reversal of the above mode of operation, with respect to the in-phase and out-of-phase signal components, should this be desired, as in a recording system. Basically, in a stereophonic signal system, equal in-phase signals at the microphones shall produce lateral modulation, and lateral modulation shall produce in-phase speaker motion, for minimum noise and distortion.

In a stereophonic phonograph system of this type, the pickup or like transducer element must provide translation between the vertical and lateral groove undulation components corresponding to vertical and lateral or in-phase and out-of-phase signal components of the stereophonically related signals, equally and in proper amplitude relation in both channels. Deviations in this relation are often introduced by tolerance variations in the construction or sensitivity of the transducer devices, unequal modulation or signal amplitudes, mechanical resonances, and phase shifts in the associated elements of the system. The mechanical angles between the axes of modulation and between each axis and the record surface are fixed according to the standard established for the system, such as 90° between axes and 45° between each axis and the record surface. The effective electrical angles between the vertical and lateral signal components may not agree with the mechanical angles between the vertical and lateral groove undulation components because of the above-mentioned and like tolerance variations, such for example as variations in the angular relation of the stylus to the transducer elements and its connections therewith.

In a stereophonic phonograph system of this type it is desirable therefore to provide correction for the above manufacturing and operational variations, differences in sensitivity of the pickup elements and their angular relation to the record and the stylus, by corrective variation in the relative response of the two signal channels so that the resultant stereophonic output signals are balanced or equalized.

It is, therefore, an object of the invention to provide in a dual-channel stereophonic signal translating system, a signal translating circuit network, embodying a minimum number of simplified and low-cost circuit elements, for balancing and adjusting the vertical and lateral, or the in-phase and out-of-phase, signal components of a pair of stereophonically related signals, thereby to correct or adjust the overall stereophonic signal output of the system.

It is also an object of this invention, to provide a signal translating circuit network of the type referred to, which provides for individual adjustment of the in-phase and out-of-phase signal components in each signal channel of a dual-channel system for stereophonic signal translation and also for adjusting the relative amplitudes of the in-phase and out-of-phase signal components to adjust the balance relation between the translated stereophonic signals in the two signal channels.

It is a still further object of this invention, to provide a signal translating circuit for adjusting the effective angular relation between translated stereophonic signals, which is adapted for use in connection with stereophonic phonograph systems for the recording or reproduction of records of the type having two stereophonically related recordings in the same groove.

In stereophonic phonograph systems, as hereinbefore pointed out, the transducer elements must provide translation between the vertical and lateral groove undulation components corresponding to vertical and lateral or in-phase and out-of-phase signal components of the stereophonically related signals, equally and in proper amplitude relation in both signal channels of the dual-channel stereophonic signal translation system.

It is, therefore, also a further object of this invention to provide a dual-channel signal translating control circuit or network for stereophonic phonograph systems which includes simple and effective means for adjusting the angular relation between the stereophonic recordings in a record and the resultant stereophonic signals, and for correcting or compensating for variations in the angular relation of the stylus to the transducer elements in a pickup or record cutter and for other manufacturing errors and sensitivity differences of the transducer elements.

In accordance with the invention, two supply circuits for stereophonically related signals in a dual-channel stereophonic signal translating system are connected serially to provide two separate signal output terminals, and a common terminal connected with the junction of the serially connected circuits. The signal supply circuits may be connected with utilization circuits for conveying amplified signals to a stereophonic recorder or the like, or such supply circuits may be connected to receive stereophonic signals from the transducer elements of a stereophonic phonograph pickup for translation to suitable utilization circuits for conveying amplified signals to stereophonic or dual loud-speaker means.

Interposed between the dual-channel stereophonic signal supply and utilization circuits is a signal translating circuit network comprising a plurality of potential-drop-producing impedance means connected in circuit to convey and control the vertical and lateral or in-phase and out-of-phase components of the stereophonic signals from both channels in predetermined relation, whereby such components can be balanced or adjusted to correct for the variations in angular relation between the applied or translated stereophonic signals. One impedance means effectively comprising two series-connected impedance elements provides for completing the network circuit for both the out-of-phase and in-phase signal components conveyed through the two signal supply circuits or channels, and a second impedance means in the network provides for completing the network circuit for only one of the signal components, such as the in-phase signal components, conveyed through both signal supply circuits or channels. Depending upon the polarity of the connections between the two supply circuits, or between the two stereophonic pickup elements for example, the in-phase signal components may be lateral signal components, and the out-of-phase signal components may be vertical signal components, or vice versa.

Generally, as indicated hereinbefore, the vertical signal components in the two signal channels are in-phase for signal translation therethrough, and the lateral signal components in the two signal channels are out-of-phase for signal translation therethrough. Stated in another way, the two signal channels, in a phonograph record reproduction system, normally operate in-phase for the vertical signal components and out-of-phase for the lateral signal components of two stereophonically related signals translated therethrough.

In one embodiment of the invention, the first potential-drop-producing impedance means for the signal supply circuits, effectively comprising the two series-connected impedance elements, is connected between the individual output terminals thereof. The second potential-drop-producing impedance means includes a resistor element connected at one end with the common output terminal of the signal supply circuits and provided with a movable contact element. A signal conveying connection is provided between the opposite end of the resistor element and an intermediate movable contact on the first impedance means. A pair of signal output or utilization circuits are connected individually each with one of the individual supply circuits output terminals and are provided with a common connection to the movable contact element.

With the signal supply circuits connected for normal operation as hereinbefore referred to, variation in the relative impedance values of the effectively series-connected impedance elements in inverse or complementary relation, as by an intermediate tap movable from one to the other end along said impedance elements, provides for adjusting or balancing the amplitudes of the out-of-phase or lateral signal components of the translated signals applied to the output circuits, and adjusts the amplitudes of the in-phase or vertical signal components, while adjustment for balance is provided by other means. Adjustment of the movable contact element along the resistor element of the first impedance means serves to adjust or balance the amplitude relation between the lateral and vertical or in-phase and out-of-phase signal components, and hence the balance or effective angular relation between the stereophonic signals, applied to the output circuits.

The signal translating circuit network may further include potential-drop-producing impedance means connected serially in each signal supply circuit, and such means may comprise two resistor elements variable in complementary or inverse relation to adjust or balance the amplitudes of the in-phase or vertical signal components applied to the output circuits. Such series impedance means may be provided by a potentiometer resistor connected serially between the two signal supply circuits, or between the two phonograph pickup transducer elements, and having a movable contact element thereon providing the common output terminal for the signal supply circuits or transducer elements in the network.

The invention will, however, be further understood from the following description of certain embodiments thereof, when considered in connection with the accompanying drawings, and its scope will be pointed out in the appended claims.

Figure 2:
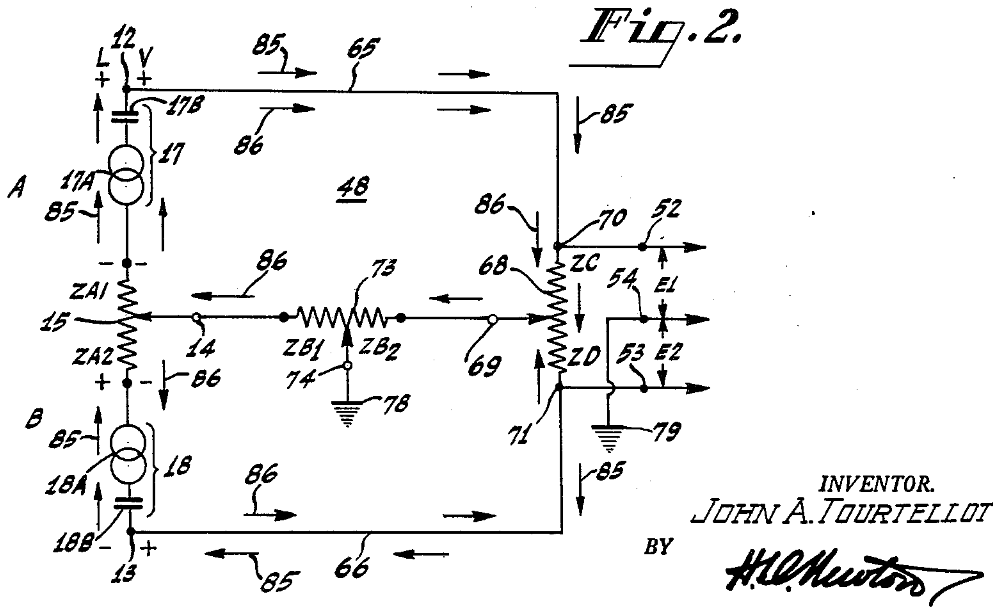
Figure 3:
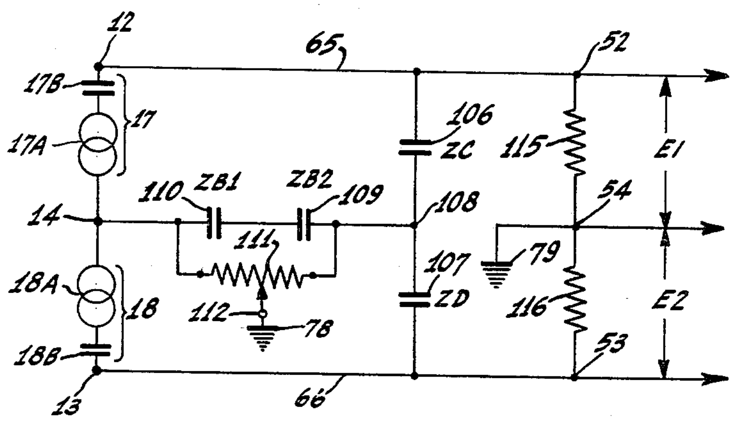
Figure 4:
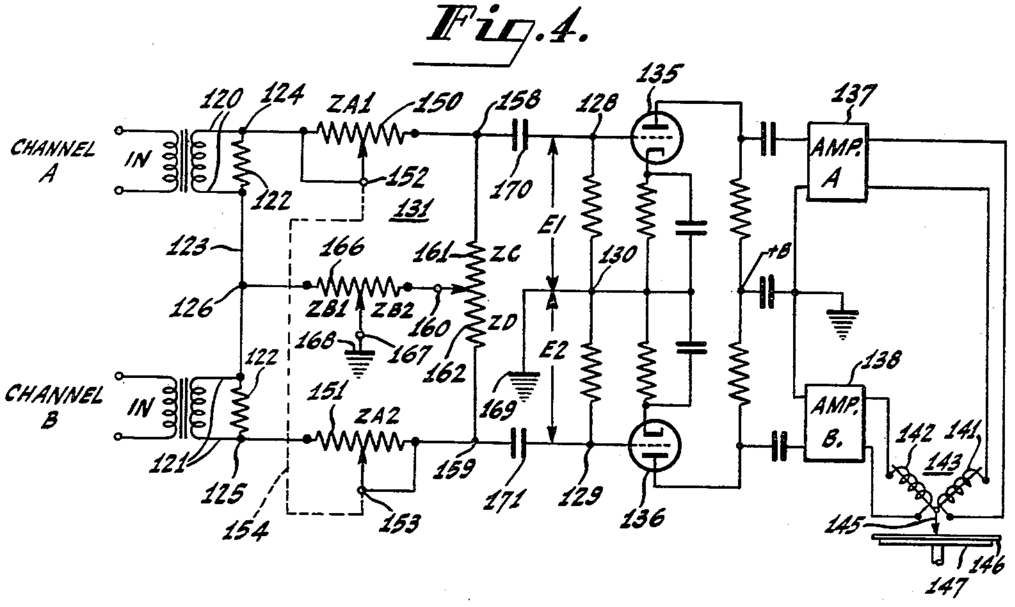

In the drawings, FIGURE 1 is a schematic circuit diagram of a stereophonic record playing phonograph system embodying the invention; FIGURE 2 is an equivalent schematic circuit diagram of a portion of the circuit of FIGURE 1, drawn to illustrate certain operational features of the invention; FIGURE 3 is a further schematic circuit diagram based upon the circuit of FIGURE 2, to illustrate a modification thereof in accordance with the invention; and FIGURE 4 is a schematic circuit diagram of a stereophonic phonograph signal translating system embodying the invention, and illustrating its use for controlling and correcting stereophonic signals used for recording, transmitting, and the like.

Referring to the drawing, wherein like reference numerals refer to like circuit elements and parts throughout the various figures, and referring particularly to FIGURE 1, two stereophonic signal supply circuits 10 and 11 having two individual output terminals 12 and 13, respectively, are series connected and provided with a common output terminal 14, which in the present example is the movable contact element of a potentiometer resistor 15 connected serially between the two circuits as shown.

Stereophonic signals are applied to the two signal supply circuits from a suitable source, such as a stereophonic phonograph pickup 16, having two stereophonic transducer elements 17 and 18 which may be of the piezo-electric ceramic type, each element having an upper electrode as indicated at 19 for the pickup element 17, and as indicated at 20 for the pickup element 18. The lower electrodes for the pickup elements 17 and 18 are indicated at 21 and 22, respectively, and are jointly connected mechanically with a common stylus element 25 which is adapted to engage the groove of a stereophonic record 26 carried by a phonograph turntable 27 for rotary movement with respect to the stylus in the usual manner for flat disc recordings. The record may be assumed to be of the type having a pair of stereophonically related recordings in the same record groove with each recording at the same angle with respect to the record surface. Preferably, it may be considered to be a 45–45 stereo record of the type hereinbefore referred to.

The transducing element 17 is connected with the supply circuit 10 and the transducing element 18 is connected with the supply circuit 11, with the upper electrodes 19 and 20 connected to the terminals 12 and 13, respectively, and with the lower electrodes 21 and 22 connected jointly with the common contact element or output terminal 14 through series resistor elements provided by the two sections of the potentiometer resistor 15 on either side of the terminal. The transducer element 17 thus provides one of the stereophonically related signals from one of the groove recordings, which is applied to the output terminals 12 and 14 through the supply circuit 10, while the transducer element 18 provides the other of the stereophonically related signals from the other of the groove recordings, which is applied to the output terminals 13 and 14.

The mechanical connection between the common stylus element 25 and the pickup elements 17 and 18 may be considered to comprise, by way of example, axially stiff and transversely flexible wire means, indicated by the lines 30 and 31, extending at right angles to each other from the stylus to the pickup elements. The mechanical connection is insulated from the electrodes and provides for driving each pickup element individually from the separate stereophonic groove recordings which are ordinarily at right angles to each other and at an angle of 45° with respect to the record surface.

The stylus element 25, in following the undulations of one side of the groove having one stereophonic recording, which may be designated as a channel A recording moves along a line generally coincident with the axis of the connecting wire 30. The wire 31 may be assumed to flex under this condition of operation, while the wire 30 is stiff axially, and thus the groove vibrations are directed through the wire connection 30 to the transducing element 17, causing said one of the stereophonic recordings in the groove to be transduced or generated thereby. Since the wire 31 flexes, no signal will be produced by the pickup element 18 under such conditions.

The same action occurs for the stereophonic recording in the opposite side of the groove, that is, the left-hand recording which may be designated as channel B. In this case, the undulations of the groove for the channel B recording will cause the stylus elment 25 to move along the line generally coincident with the axis of the wire 31, while the wire 30 flexes. Since the wire 31 is stiff axially, the groove vibrations will be directed therethrough to the transducing element 18 causing the other stereophonically related signal to be transduced or generated thereby. Due to the flexing of the connecting wire 30 no signal will be generated by the pickup element 17. With the recordings in both channels, that is, in both walls of the V-shaped groove of the record, the stylus element 25 will have a composite motion jointly imparted thereto by the vertical and lateral undulation components of the dual groove modulation.

The transducing elements 17 and 18 generally have the same angular operating relation to the stylus element 25 along the two axes of modulation, which coincide with the axes of the connecting wires 30 and 31 in the present example, and provide separate or selective signal translation of the two groove recordings to the two signal supply channels or circuits 10 and 11. These pickup elements are connected with the signal supply circuits in polarity relation such that the vertical undulation components of the groove modulation may produce in-phase vertical signal components and the lateral undulation components of the groove modulation may produce out-of-phase lateral signal components in the two circuits. Thus, the polarity relation of electrodes in the present example is such that the electrodes 19 and 20 change in like polarity or in in-phase relation, for operation of the pickup elements 17 and 18 in response to vertical movement of the stylus element 25. This polarity relation changes as to one pickup element if the stylus element moves laterally, or to the left and right, as viewed in the drawing. The electrodes 19 and 20 then change in unlike polarity, or in out-of-phase relation. Reversal of the polarity of the connection to one pickup or transducer element provides a reversal of the above mode of operation with respect to the in-phase and out-of-phase signal components.

If two like in-phase recordings, for example, are provided simultaneously in the record groove, that is, in channels A and B of the record, the net effect will be to move the stylus element 25 up and down in a vertical plane. This produces axial components of movement which normally are directed equally along the connecting wires 30 and 31, so that in-phase signals of equal amplitude with respect to the common terminal 14, will be derived from the upper electrodes 19 and 20 of the two transducing elements, and applied to the supply circuit terminals 12 and 13. If the two signals recorded in the record groove, that is, in channels A and B of the record, are 180° out-of-phase simultaneously, then the net effect is to move the stylus element 25 equally laterally from center or point of rest. This normally produces equal and opposite lateral components of movement in the connecting wires 30 and 31, causing one of the transducing elements to reverse polarity, which one depending on the direction of lateral movement of the stylus from the midpoint of rest. Thus, equal amplitude signals with respect to the common terminal 14, 180° out-of-phase, will be derived from the upper electrodes of the two transducing elements and applied to the supply circuit terminals 12 and 13. If the connections from one of the transducing elements to the signal supply circuits 10 or 11 is reversed, the phasing of the signals at the terminals 12 and 13 will be such that the above described lateral record groove undulations may produce corresponding in-phase or like polarity signals of equal amplitude and the vertical record groove undulations may produce out-of-phase or unlike polarity signals of equal amplitude.

The corresponding effective angular relation between the stereophonic signals in the signal supply circuits 10 and 11, that is, between the stereophonically related signals of channels A and B may be considered to exist as indicated in a line of graphs 33, 34, and 35 in FIGURE 1. The graph 33 serves to indicate the normal effective angular relation for the above conditions of operation, between the two stereophonic signals translated through the supply circuits 10 and 11 from the pickup elements 17 and 18, in response to the stereophonic groove recording to which the stylus element 25 is applied. Correction or compensation for deviations in this relation as introduced by tolerance variations in the construction or sensitivity of the transducer devices, mechanical resonances, and phase shifts in the associated elements of the signal translating system, will now be considered. As one example, the mechanical angles between the axes of the connecting wires 30 and 31 in the pickup element 16 and between each of these axes and the record surface, may vary from the axes of modulation of the record groove.

The vertical and lateral signal components of the two stereophonic signals A and B in the supply circuits 10 and 11, represented by the arrowed lines 36 and 37 in the graph 33, therefore, may not agree with the vertical and lateral groove undulation components of the record groove because of variations in the angular relation of the stylus element to the transducer elements and its connections thereto. For example, in the manufacture of the pickup 16, the axes 30 and 31 of the connecting wires and the angular relation of the pickup elements 17 and 18 to the stylus element 25 may be such that the 90° angle between the axes of modulation and the 45° angle between each axis and the record surface may not be maintained, resulting effectively in an angular relation between the stereophonic signals in the two channels A and B, as represented, for example, by the arrowed lines 38 and 39 in the graph 34. It will be noted that the channel A angle to the record surface is designated as 50°, while the channel B angle is designated at 20°, and an undesirable 110° angle thus exists between the two stereophonic components of the stereophonic signals conveyed by the channels A and B.

Thus, it will be seen that equal vertical and lateral undulation components of the stereophonic record groove modulation may not produce at the output terminals 12, 13 and 14 of the supply circuits 10 and 11, an exact stereophonic signal replica of the groove modulation because of unbalance in the amplitudes of the resultant corresponding signal components. As indicated in the graph 34, the angular relation between the two stereophonic signals, or channels A and B, results from vertical and lateral signal components in each channel which are unbalanced, that is, of different amplitudes. This unbalanced amplitude relation between the vertical and lateral signal components of the two stereophonic signals in channels A and B, as represented by the graph 34, is shown in a graph 40 in FIGURE 1. The relative amplitudes of the vertical and lateral signal components as derived from the channel A and B recordings and translated into the corresponding stereophonically related signals in the supply circuits 10 and 11, can be visualized through this means.

Referring to the graph 40, it will be seen that a signal derived from the channel A recording, having a resultant electrical 50° angle to the record surface instead of a 45° angle, would have a relatively higher amplitude vertical signal component and a relatively lower amplitude lateral signal component as the result of equal vertical and lateral incremental movements of the stylus element 25 in connection with the pickup element 17, if, for example, the pickup assembly is such that the angular relation of the connecting wires 30 and 31 assume the same angular relation as the lines 38 and 39 in the graph 34. These relative amplitudes are indicated in the graph 40 for channel A by the relative lengths of the arrowed lines 41 and 42, respectively.

In a like manner, the channel B recording resulting in a stereophonic signal having effectively a 20° angle to the record surface, as indicated in the graph 34, may comprise vertical and lateral signal components having relative amplitudes as indicated by the relative lengths of the arrowed lines 43 and 44, respectively, in the graph 40. This is because, with the angular relation of 20° to the record surface rather than 45° for the stylus connection 31, for example, an incremental vertical movement of the stylus element 25 will tend to produce a relatively lesser voltage component, while an equal incremental lateral movement of the stylus element 25 will tend to produce a relatively greater voltage component as represented by the relative lengths of the arrowed lines 43 and 44 in the graph 40.

From the foregoing consideration it will be seen that balancing and adjusting the vertical and lateral, or in-phase and out-of-phase, signal components of the pair of stereophonically related signals in channels A and B, or supply circuits 10 and 11, may provide for change in, or correction of, the effective angular relation between said signals or, in other words, for balancing the two channels so that the stereophonic output signals are balanced or equalized.

For this purpose, in accordance with the invention, a signal translating circuit network is provided in connection with the supply circuits 10 and 11 and interposed as a coupling or translating means between the supply circuits and signal utilization means, which, in the present example, is the remainder of the stereophonic phonograph record playing system. This comprises a pair of stereophonic signal utilization circuits or channels 49 and 50, having individual input terminals 52 and 53 and a common input terminal 54, and connected through suitable individual amplifiers 55 and 56 to stereophonic or dual loud speaker means 57 and 58. Volume control means for the system is represented by a potentiometer 59 connected in the utilization circuit 49 for the amplifier 55, and a similar potentiometer 60 connected in the utilization circuit 50 for the amplifier 56. As indicated by the dotted connection 61, the potentiometers are arranged for unitary control, whereby the gain through both of the signal channels may be controlled in the same sense and equally, and the relative signal amplitudes at the speaker means 57 and 58 may be balanced by individual adjustment before being connected for unitary control.

The signal translating circuit network 48 provides a direct signal conveying connection, indicated by the lead 65, between the individual output terminal 12 of the supply circuit 10 and the individual input terminal 52 of the utilization circuit 49. Likewise, a direct signal conveying connection is provided through the network, as indicated by the connection lead 66, between the individual output terminal 13 of the supply circuit 11 and the individual input terminal 53 of the utilization circuit 50. Connected between the output terminals 12 and 13, through the leads 65 and 66, or between the input terminals 52 and 53, is a potential-drop-producing impedance means comprising, in the present example, a potentiometer resistor 68 having a movable contact element 69 thereon. The potentiometer may have a resistance value of one megohm, for example, and represents any potential-drop-producing impedance means connected effectively across the two signal supply circuits for conveying signal currents serially through the signal supply circuits in response to out-of-phase signal potentials at the terminals 12 and 13. A potential drop, due to both in-phase and out-of-phase signal current flow, is provided between the movable contact element 69 and one terminal 70 of the potentiometer resistor element 68 and between the contact element 69 and the other terminal 71 of the potentiometer resistor element 68.

A second potential-drop-producing impedance means is provided in the network for completing the network and conveying the in-phase signal components through both signal supply circuits. In the present example, this comprises a second potentiometer resistor 73 having a movable contact element 74 thereon, the resistor 73 being connected at one terminal 75 with the common output terminal 14 of the signal supply circuits 10 and 11, while the opposite terminal 76 is connected through signal conveying connection means provided by a connection lead 77, with the movable contact element 69. The movable contact element 74 is connected to chassis or common ground 78 for the system and, through ground as indicated at 79 and a connection lead 80, to the common input terminal 54 of the utilization circuits. The resistance value of the resistor element 73, in the present example, may be 100,000 to 500,000 ohms, or even more, depending upon the range of control required.

The signal translating circuit network further includes potential-drop-producing impedance means connected effectively serially in each signal supply circuit, and variable in complementary or inverse relation. In the present example, such series impedance means is provided by the potentiometer resistor 15 which is connected serially between the two signal supply circuits 10 and 11, or effectively between the two phonograph pickup transducer elements 17 and 18. This may be considered, in the present example, to have an ohmic resistance of 50,000 to 100,000 ohms, or even less, depending upon the control range required. Since the terminal 14 is the common output terminal for both signal supply circuits, it will be seen that one portion of the potentiometer between the terminal 14 and one end terminal 82 of the resistor element 15 is connected serially in one signal supply circuit, while the portion between the terminal 14 and the other end terminal 83 is connected serially in the ohter signal supply circuit.

With the signal supply circuits connected for normal operation as hereinbefore referred to, variation in the relative impedance values between the terminal 69 and the terminals 70 and 71, in inverse or complementary relation, as is provided by moving the contact 69, provides mainy for adjusting or balancing the relative amplitudes of the out-of-phase or lateral signal components of the translated signals applied to the output or utilization circuits 49 and 50. Variation in the relative impedance values between the terminals 14 and 82 and 14 and 83 by movement of the contact 14 provides mainly for adjusting or balancing the relative amplitudes of the in-phase or vertical signal components applied to the output or utilization circuits 49 and 50. Adjustment or movement of the contact element 74 along the resistor 73 serves to adjust or balance the amplitude relation between the lateral and vertical or out-of-phase and in-phase signal components, and hence the effective angular relation or the balance between the two stereophonically related signals, applied to both the output or utilization circuits 49 and 50. The equalized stereophonic signal potentials in the dual-channel utilization circuit are represented by the signal voltage designations E1 and E2 in the circuit of FIGURE 1. The stereophonic signals or signal potentials must be equalized and balanced in order to provide equalized and balanced signals at the loud speaker means 57 and 58, for proper stereophonic signal reproduction from a record 26 when played through the system shown.

The signal translating circuit network 48 therefore provides for balancing and adjusting the vertical and lateral signal components of a pair of stereophonically-related signals, thereby to correct or change the overall stereophonic response of the signal translating system. The network includes a minimum number of simplified and low-cost circuit elements in the present example, although it is not limited to the use of resistive elements of the potentiometer type for its component parts, as will appear from a consideration of equivalent circuits of the signal translating network shown in FIGURES 2 and 3, to which attention is now directed.

Referring particularly to FIGURE 2, the pickup element 17, being of the ceramic type, is equivalent to a zero-impedance signal generating element 17A and a capacitor element 17B in series relation. Likewise, the pickup element 18 is equivalent to a similar signal generating element 18A and a series capacitor element 18B. The pickup elements are connected with the signal supply terminals 12 and 13 and the two pickup elements are series connected through the resistor element 15, which is provided with the common output contact or terminal 14, as hereinbefore described.

The two effectively series-connected stereophonic signal supply means having the two individual output terminals 12 and 13 are connected through the leads 65 and 66 with the input terminals 52 and 53 respectively of the two effectively series-connected utilization circuits 49 and 50, in dual-channel relationship, as in the circuit of FIGURE 1. The first potential-drop-producing impedance means 68 is connected between the output terminals 12 and 13 for conveying out-of-phase signal components serially through the supply circuits or pickup elements. This impedance means may be considered to comprise two series-connected impedance elements ZC and ZD between the terminals 70 and 71, on either side of the movable contact 69. Thus, as the contact 69 is moved, the impedances of the ZC and ZD impedance elements are caused to be varied in complementary relation inversely.

Since the common input terminal 79 of the utilization circuits is connected to the movable contact element 74 and thence through the potentiometer element 73 to the movable contact 69, adjustment of the contact 69 serves mainly to balance the amplitude relation of the out-of-phase or lateral signal components of the two translated stereophonic signals between the two output or utilization circuits 49 and 50. This adjustment equalizes or changes the lateral signal potential drop in the impedance elements ZC and ZD and compensates for any potential differences or amplitude differences in the lateral signal components in these two circuits as may be derived as the result of undesired stereophonic signal angular variation, or variation in sensitivity of pickups, element to element or channel to channel, and any factors hereinbefore discussed which may tend to provide variations in the angular relation of the axes of modulation in the record and the effective corresponding electrical angles between the resultant stereophonic signal voltages E1 and E2 in the utilization circuits.

The second potential-drop-producing impedance means 73 connected between the junction of the impedance elements ZC and ZD and the common terminal 14 of the signal supply circuits or transducer elements, serves to convey in-phase signal components, that is, the vertical signal components in the present example, which flow through the signal supply circuits or transducer elements. This impedance element may be considered to be divided into two impedance elements or components ZB1 and ZB2 on either side of the contact element 74. The portion ZB2 is increased in impedance value as the contact element 74 is moved to the left as viewed in the drawing, thereby including in circuit with the output terminal 54 the signal component voltage developed in the impedance element ZB2, which is added to the potential developed across the impedance elements ZC and ZD as the result of the flow of in-phase signal currents from the terminals 12 and 13. Adjustment of the contact element 74 therefore serves to provide for balancing the in-phase and out-of-phase of lateral and vertical signal components of the two stereophonic signal voltages E1 and E2 in the dual-channel utilization circuit 49—50. It does this without unbalancing the impedance relations of the two signal channels.

The third potential-drop-producing impedance means 15 connected serially in each of the signal supply circuits, or in series with the pickup elements of the present example, provides two related impedance elements ZA1 and ZA2 on either side of the contact or common output terminal 14. The impedance elements ZA1 and ZA2 are relatively variable by moving the contact 14 along the resistor element 15, thereby to vary or balance the vertical signal component voltages between the terminals 12 and 14 and 13 and 14 and the vertical signal component current flow from the terminals 12 and 13 through the impedance elements ZC and ZD. It will be seen that the contact 14 may be adjusted to control the vertical or in-phase signal current flow to balance or change the in-phase or vertical signal components which flow through the impedance elements ZC and ZD, and therefore the amplitude relation of vertical or in-phase signal components of the stereophonic signals in the dual-channel output or utilization circuit 49—50.

In order to provide a better understanding of the relation of the vertical and lateral signal current flow through the signal translating network, the polarity relations and current flow at an instant in the operation is shown by the L and V polarity indicators, and the ring of arrowed lines 85 in end-to-end relation about the exterior of the circuit network, for the instantaneous path of lateral or out-of-phase signal currents generated by the transducer elements 17 and 18, with the terminal 12 going positive and the terminal 13 going negative, corresponding to the movement of the stylus laterally in one direction. The signal current flow is serially through the impedance means 15 and 68. At the same time, the inner ring of arrowed lines 86 represents the flow of the vertical or in-phase signal component currents when the terminals 12 and 13 are going positive simultaneously with respect to the common terminal 14. It will be seen that the vertical signal component currents 86 flowing through the transducer elements from the terminals 12 and 13, flow through the impedance elements ZC and ZD and the common intermediate terminal 69, thence through the impedance element 73 serially back to the common terminal 14 of the supply circuits, and thence in opposite directions through the impedance means 15 and the supply circuits or pickup elements 17 and 18. The impedance means 15 and 68 are thus connected serially with the supply circuits and in common to both the in-phase and out-of-phase signal components.

From a consideration of the current flow through the network, it will be seen that only the vertical or in-phase signal currents flow through the impedance means 73. The impedance means 15 and 68 are effectively common to both signal components but the impedance means 73 is common to only one signal component. The vertical signal components of the output voltages E1 and E2 are the sums of the voltages across the impedance elements ZC ZB2 and ZD ZB2 respectively. For the lateral signal components of the signal voltages E1 and E2, only the voltages across the impedance elements ZC and ZD are applied as results from the flow of the out-of-phase currents serially therethrough from the pickup elements or supply circuits.

Adjustment of the contact 69 serves to balance or equalize the lateral signal components 41 and 44 shown in the graph 40 of FIGURE 1, whereby they may be equal in both output circuits 49 and 50 and have equal amplitude values as represented by the arrowed line 90 in a graph 91 in FIGURE 1. Adjustment of the contact 14 provides for balancing the unbalanced vertical signal components 42 and 43 represented in the graph 40, whereby they are equalized in the output circuits 49 and 50, as indicated by the arrowed line 92 in the graph 91. Since the two vertical signal components and the two lateral signal components are then balanced in amplitude in both portions of the output circuit 49—50, the angular relation of the two stereophonic signals A and B with respect to the record surface reference is then equalized as shown, for example, in the graph 35 of FIGURE 1, by the arrowed lines 95 and 96. However, because of the difference in amplitudes between the lateral and vertical signal components that may then exist in the two output circuits, as represented by the unequal lengths of the arrowed lines 90 and 92 in the graph 91, the undesirable 110° angular relation may exist between the two stereophonic signals, as represented in the graph 35 between the lines 95 and 96.

In the control circuit shown, the value of the impedance ZB2 of FIGURE 2 is increased by movement of the potentiometer contact element 74 to the left as viewed in the drawing, thereby bringing the vertical signal component up to equal the lateral signal component in both channels of the output or utilization circuit, as indicated in the graph 98 in FIGURE 1 by the arrowed lines 99 and 100 respectively. With the vertical and lateral signal components equalized in both channels, the angular relation of the two stereophonically related signals for the channels A and B is as indicated by the arrowed lines 101 and 102 in the graph 35. This is the same as the standard angular relation of the two signals as represented in the graph 33. Therefore, by varying the position of the contact element 74, corrective signal voltage may be applied in both portions of the output or utilization circuit 49—50 for the vertical or in-phase signal components. Thus the amplitude relation of the lateral and vertical components of the stereophonic signal voltages E1 and E2 can be adjusted or balanced, thereby to adjust or balance the angular relation thereof to a desired value or standard. This is accomplished without unbalancing the impedance relations established between the two signal channels, since the impedance element 73 conducts only the in-phase signal components and is equally in both portions of the output circuit.

The signal translating circuit network described thus provides means for adjusting the amplitude ratio of in-phase and out-of-phase signals in a two-channel amplifier or signal translating system. The control effect of such a network in a dual-channel stereophonic signal translating system, such as the phonograph system shown and described, may further be understood from the following consideration of the present circuit.

Consider the pickup 16 connected as described so that a laterally-modulated or lateral-cut recording would produce a push-pull signal across channels 10 and 11 at the terminals 12 and 13 and at the terminals 52 and 53, the contact element 14 on the impedance element 15, or ZA1–ZA2, can be adjusted to produce equal signal voltages, in-phase, from the terminals 12 and 13 or 52 and 53 with respect to ground 78—79, when playing a vertically modulated recording. The impedance element ZC or ZD constituting the impedance element 68, can be adjusted to produce equal signal voltages, out-of-phase, from the terminals 12 and 13 or 52 and 53 with respect to ground 78—79, when playing a laterally-modulated frequency record.

The signal appearing across the impedance element 73, or ZB1–ZB2, is a vertical or in-phase signal component. The portion of this signal component in the impedance element ZB1 is out-of-phase with the portion in the impedance element ZB2. By adjustment of the tap or movable contact element 74 on the impedance element 73 the in-phase, or vertical, signal component voltages from the terminals 12 and 13 or 52 and 53 to ground, can be made equal to, greater than, or less than the lateral, or out-of-phase signal component voltages at these terminals, thereby to adjust the angular relation between the translated stereophonic signals.

The impedance element ZC and ZD of FIGURE 2 may be provided by other means, for example as shown in the circuit of FIGURE 3. Here two equal capacitors 106 and 107 are connected serially between two output terminals 12 and 13 as the two elements of the impedance means. The junction 108 of the impedance elements 106 and 107 is connected through two series capacitors 109 and 110, constituting a second impedance means, with the junction or common terminal 14 of the signal supply circuits or pickup elements. The capacitors 106, 107, 109 and 110 may have equal capacitance values of the order of 2200 mmfd., for example, when the capacitance value of each pickup element at 17B and 18B is of the order of 660 mmfd. A potentiometer resistor 111, having a movable contact element 112 connected to common ground 78 is connected across or in parallel with the series connected capacitors 109 and 110. The potentiometer 111, with the movable contact element 112, serves to provide a voltage divider for the series connected impedance elements ZB1 and ZB2 provided by the series connected capacitors 109 and 110. This may have an ohmic resistance of 5 megohms in the present example.

The output or utilization circuit terminals 52 and 53 are connected with the terminals 12 and 13, respectively, through the circuit leads 65 and 66, as in the circuits of FIGURES 1 and 2. The common terminal 54 for the utilization circuits is connected through ground 79 and 78 with the contact element 112 as in the circuits referred to. Loading resistors, 115 and 116, of one megohm each, for example, are provided across or in parallel with the output circuits.

The output sterephonic signal voltages E1 and E2 in the circuit of FIGURE 3, may be assumed to be balanced as to the lateral and the vertical components, assuming an idealized condition where the pickup elements 17 and 18 are adjusted or constructed according to standards for producing balanced lateral and vertical stereophonic signal components in the relation shown in the graph 91 for example. However, it may be necessary to balance or equalize the vertical signal components with the lateral signal components in the dual-channel output circuit according to the graph 98. To do this the effect of the impedance elements ZB1 and ZB2 in the circuit may be varied by movement of the potentiometer contact 112 to include a greater or lesser amount of the voltage drop through the elements, ZB2 and ZB1, which provide potential-drop-producing impedance means in the common circuit connection which conveys the in-phase or vertical signal component currents.

Thus it will be seen that certain of the impedance elements in the signal translating network may be fixed if adjustment is unnecessary by reason of initially better balance of the signal components applied to the utilization or output circuits from the signal supply means. In any case, however, adjustment between the vertical and lateral, or in-phase and out-of-phase, signal components in both output circuits may be provided by the impedance means ZB1-ZB2 in the network, the elements of which are relatively adjustable. If further adjustment of the relative values of the signal components may be necessitated by reason of distributed capacity along the signal channels, for example, as represented by the dotted capacitors 118 and 119 in the circuit of FIGURE 1, such adjustment is provided by the circuits described.

A corrective signal translating circuit network may be applied to any dual-channel stereophonic signal translating system of the type wherein two stereophonically related signals are conveyed in separated signal channels. For example, the signal translating circuit network of the present invention is particularly adapted for use in connection with a phonograph recording system for controlling the angular relation of the stereophonic signals applied to recording means such as a record cutter, as shown more particularly in FIGURE 4, to which attention is now directed.

In the phonograph recording system shown, two stereophonic signal channels A and B, in a stereophonic signal translating system, comprise a transformer coupled supply circuit 120 and a second transformer coupled supply circuit 121 for separate stereophonic channel input, as indicated. The circuits are provided with individual shunt loading resistors 122 and are connected in series through a lead 123. Separate individual output terminals 124 and 125 are provided for the circuits and a common terminal 126 is provided in connection with the lead 123. A stereophonic signal utilization circuit having input terminals 128, 129 and 130 is coupled to the dual-channel stereophonic signal supply circuit through a signal translating control network 131 which, as in the preceding example, provides for adjusting the angular relation between the applied signals from the signal supply circuit and the signals applied to the utilization circuit.

In the present example, the utilization circuit comprises two amplifier stages represented by the amplifier tubes 135 and 136 which are impedance coupled to further recording amplifiers 137 and 138 respectively. The amplifiers 137 and 138 are in turn respectively connected with the operating elements of the recording device, such as the coils 141 and 142 of a record cutter 143. The stereophonic signal voltage E1 applied between the input terminals 128 and 130 is amplified and applied to the recorder element 141, while the stereophonic signal voltage E2 applied between the terminals 129 and 130 is amplified and applied to the recorder element 142. In the present example, the recorder elements 141 and 142 are connected to jointly operate a cutter stylus 145 for cutting a record blank 146 as it is rotated by the turntable 147. The general arrangement of the stylus 145 and its operating relation to the driver elements 141, 142 is substantially the same as described for the pickup device of FIGURE 1, and the same mechanical and electrical variations from a prescribed standard may obtain in the operation of the system.

The dual-channel signal translating control circuit or network of the present invention is applicable to this system for adjusting variations in the angular relation between the applied signals and the recordings therefrom, which may result from variations in the angular relation of the stylus to the transducer elements in the record cutter, or to correct or compensate for variations in the angular relation of the applied stereophonic signals, and any other factors tending to provide variation in the angular relation of the axes of modulation in the record and the electrical angles between the applied stereophonic signals.

To this end the signal translating circuit network 131 is interposed in circuit between the stereophonic signal supply circuits 120 and 121 and the signal utilization circuits at the terminals 128, 129 and 130. As in the preceding translating circuits, a series impedance element is provided in each input circuit, and in the present example comprises a series variable resistor 150 connected in the supply circuit 120 and a second series variable resistor 151 connected in the supply circuit 121. The resistors may, for example, have resistance values of 50,000 ohms, and are provided with movable contacts 152 and 153 respectively. The contacts are connected for joint operation, as indicated by the dotted line 154, to vary the series impedance or resistance interposed in the two circuits inversely in complementary relation, whereby, as the impedance of the element 150 is increased, the impedance of the element 151 is decreased, and vice versa. By this means, the relative values of the vertical or in-phase signal components from the two supply circuits 120 and 121 can be adjusted in proper amplitude relation for balance at terminals 158 and 159, with respect to the common terminal 160 and ground. The terminal 160 is a contact element movable between and along two impedance elements 161 and 162 from the position shown. As in the preceding translation circuits, the junction point is provided by the movable contact element for a potentiometer resistor comprising the two impedance or resistor elements 161 and 162, which may have a total resistance value of 100,000 ohms in the present example. In this case, the relative impedances of the two elements 161 and 162 are varied inversely or in complementary relation by the junction connection being movable from one to the other and along said impedance elements, thereby to balance or adjust the lateral or out-of-phase signal components at the utilization circuit terminals 128 and 129 with respect to ground or the terminal 130.

Connected between the terminal 160 and the common supply terminal 126 is a potential-drop-producing impedance means comprising a potentiometer resistor 166 having a movable contact element 167 connected to common ground 168 and thence through ground 169 to the common input terminal 130 for the utilization circuits. This potentiometer resistor may have a resistance value of 50,000 ohms in the present example, and provides for balancing or adjusting the angular relation of the stereophonic signals applied to the recorder from the supply circuits, as described for the prior circuits considered. The terminal 158 is coupled to the input terminal 128 through a coupling capacitor 170, while the terminal 159 is coupled to the input terminal 129 through a coupling capacitor 171, thereby coupling the input and output circuits for signal translation through the control network 131.

From the foregoing description it will be seen that a signal translating circuit in accordance with the invention may be applied to any dual-channel stereophonic signal translating system for controlling the stereophonic response thereof. It provides simple and effective means for adjusting the amplitude ratios of in-phase and out-of-phase signals in a two channel amplifier or signal translating system. It provides, in connection with a stereophonic pickup device, or like transducer device, for controlling the effective electrical angles of the transducer response or of the translated signals with respect to modulation axes of the groove recordings. For 45–45 stereophonic record playing, the in-phase and out-of-phase, or vertical and lateral, signal components may be equalized or adjusted in the amplifier system. The adjustment of the angularity between the stereophonic signals is provided without introducing unbalance in the impedance relations established between the two signal translating channels, either in the supply circuits or in the utilization circuits, and the signal translating circuit network may be provided by a minimum number of simplified and low cost circuit elements.

I claim:

1. In a dual-channel signal translating system for two stereophonically-related audio-frequency signals, each having a pair of quadrature signal components, one component of each pair being in-phase with each other, and the other component of each pair being out-of-phase with each other, a signal translating circuit network for controlling the amplitude relation of said in-phase and out-of-phase signal components of said two stereophonically-related signals translated through the system, comprising in combination, a signal supply circuit for each of said stereophonically-related signals, means providing two individual output terminals and one common output terminal for said circuits, in-phase signal component conveying impedance means having terminal ends connected at one of said end terminals with said common output terminal, common in-phase and out-of-phase signal component conveying impedance means for said circuits connected between said individual output terminals, means providing an in-phase signal component conveying connection between the other of said end terminals of said in-phase signal conveying impedance means and an intermediate point on said common conveying impedance means, and a pair of stereophonic signal output signal output circuits connected individually each with one of said individual output terminals and having a common connection with said in-phase signal conveying impedance means at an intermediate point thereon.

2. In a dual-channel signal translating system for two stereophonically-related audio-frequency signals, each having a pair of quadrature signal components, one component of each pair being in-phase with each other, and the other component of each pair being out-of-phase with each other, a signal translating circuit network for adjusting the stereophonic balance between said signals, comprising in combination, two signal supply circuits for said stereophonically-related signals having individual output terminals and a common terminal, two utilization circuits for said signals having two input terminals connected in dual-channel relation each with one of said output terminals and having a common input terminal, signal-conveying resistor means having terminal ends connected at one of said end terminals with said common supply circuit terminal and having a movable contact element thereon connected with said common input terminal, signal-conveying shunt impedance means for said signal supply circuits connected between said individual output terminals, and means providing a signal conveying connection between the other of said end terminals of said resistor means and an intermediate point on said shunt impedance means.

3. In a dual-channel signal translating system for two stereophonically-related audio-frequency signals, each having a pair of quadrature signal components, one component of each pair being in-phase with each other, and the other component of each pair being out-of-phase with each other, a signal translating circuit network for adjusting the effective angular relation between said stereophonically-related signals, comprising in combination, two series-connected stereophonic signal supply circuits having individual output terminals and a common terminal, two series-connected stereophonic signal utilization circuits having two input terminals connected in dual-channel relation each with one of said output terminals and having a common input terminal, first potential-drop-producing impedance means connected between said output terminals for conveying said out-of-phase signal components serially through said signal supply circuits, said impedance means having a movable contact thereon for equalizing the out-of-phase signal components applied to said utilization circuits, second potential-drop-producing impedance means connected between said movable contact and the common terminal of said signal supply circuits for conveying said in-phase signal components in parallel through said signal supply circuits, and means providing a variable signal output connection on said second impedance means for the common input terminal of said utilization circuits for adjusting the amplitude relation of said in-phase and out-of-phase signal components and thereby the effective angular relation between the translated stereophonically-related signals applied to said utilization circuits.

4. In a signal translating system, the combination with two signal supply circuits for two stereophonically-related audio-frequency signals each having a pair of quadrature signal components, one component of each pair being in-phase with each other, and the other component of each pair being out-of-phase with each other, of means for adjusting and balancing said components to change and correct the overall stereophonic response of said system, comprising in combination, first potential-drop-producing impedance means connected serially between said signal supply circuits, means providing two individual output terminals and a common output terminal for said signal supply circuits, said common output terminal connected to a movable intermediate contact point on said first impedance means, second potential-drop-producing impedance means connected between said two individual output terminals, third potential-drop-producing impedance means connected between said common output terminal and a movable intermediate contact point on said second impedance means, a pair of stereophonic signal output circuits individually connected each with one of said two individual supply circuit terminals and in common to a movable intermediate contact point on said third impedance means, said movable intermediate contact point on said first impedance means being effective to adjust the relative amplitudes of the in-phase signal components in said output circuits, said movable intermediate contact point on said second impedance means being effective to adjust the relative amplitudes of the out-of-phase signal components in said output circuits, said movable intermediate contact point on said third impedance means being effective to vary the relative amplitudes of the adjusted in-phase and out-of-phase signal components to provide a balanced relation between the translated stereophonically-related signals in said output circuits.

5. In a dual-channel stereophonic phonograph system for use with records of the type having a pair of stereophonically-related recordings in the same record groove with each recording at the same angle with respect to the record surface, a signal translating circuit network for balancing and equalizing the stereophonic signal output of the system, comprising in combination, two signal supply circuits for stereophonically-related signals corresponding to said recordings and having vertical and lateral signal components corresponding to vertical and lateral record groove undulation components, two signal utilization circuits connected in dual-channel relation each with one of said supply circuits, first impedance means connected in common with said supply circuits establishing the relative amplitudes of the vertical signal components of said translated stereophonic signals applied to said utilization circuits, second impedance means having one end thereof variably connected to said first impedance means and having an intermediate point thereon variably connected in common with said utilization circuits for adjusting the relative amplitudes of the vertical with respect to the lateral signal components of translated stereophonic signals applied to said utilization circuits, and third impedance means connected across said utilization circuits for establishing the relative amplitudes of the lateral signal components of said translated stereophonic signals applied to said utilization circuits, an intermediate point on said third impedance means connected to the other end of said second impedance means.

6. In a dual-channel stereophonic phonograph system for use with records of the type having a pair of stereophonically-related recordings in the same record groove with each recording at the same angle with respect to the record surface, a signal translating circuit for controlling the amplitude relation of vertical and lateral signal components, corresponding to vertical and lateral record groove undulation components, in two stereophonically-related signals corresponding to said recordings, and the stereophonic response of the system, comprising in combination, two stereophonic record transducer elements, means providing individual output terminals and a common output terminal for said transducer elements, a potentiometer resistor having end terminals connected at one of said end terminals with said common output terminal and having a movable contact thereon, impedance means connected between said individual output terminals, means providing a signal conveying connection between the other of said end terminals of said potentiometer resistor and an intermediate point on said impedance means, and a pair of stereophonic signal output circuits connected each with one of said individual output terminals and having a common connection with said movable contact.

7. In a dual-channel stereophonic phonograph system for use with records of the type having a pair of stereophonically-related recordings in the same record groove with each recording at the same angle with respect to the record surface, a signal translating circuit for controlling the amplitude relation of vertical and lateral signal components, corresponding to vertical and lateral record groove undulation components, in two stereophonically-related signals corresponding to said recordings, and the stereophonic response of the system, comprising in combination, two series-connected stereophonic pickup circuits having two separate output terminals and a common output terminal, two stereophonic signal output circuits connected in dual-channel relation each with one of said separate output terminals and having a common terminal, a potentiometer resistor having end terminals connected at one of said end terminals with the common output terminal of said pickup circuits and having a movable contact thereon connected with said common output circuit terminal, shunt impedance means connected between said separate output terminals, and means providing a signal conveying connection between the other of said end terminals of said potentiometer resistor and said shunt impedance means at an intermediate point thereon.

8. In a stereophonic phonograph system for use with records of the type having a pair of stereophonically-related recordings in the same record groove with each recording at the same angle with respect to the record surface, the combination with a stereophonic phonograph pickup having two series-connected transducer elements for deriving a pair of stereophonically-related signals each having vertical and lateral signal components in quadrature relation and corresponding to said pair of recordings, of a dual-channel signal translating circuit for controlling the relative amplitudes of said vertical and lateral signal components and balancing and equalizing said stereophonically-related signals, comprising in combination, impedance means having end terminals connected in shunt relation to said series-connected transducer elements, potentiometer means including a resistor element connected between the junction of said series-connected transducer elements and an intermediate point on said impedance means and having a movable contact element thereon, means providing an output connection for one channel of said translating circuit with one of said end terminals of said impedance means and said contact element, and means providing a second output connection for the other channel of said translating circuit with the other of said end terminals of said impedance means and said contact element.

9. In a stereophonic phonograph system for use with records of the type having a pair of stereophonically-related recordings in the same record groove with each recording at the same angle with respect to the record surface, the combination with a stereophonic phonograph pickup having two series-connected transducer elements for deriving a pair of stereophonically-related signals each having vertical and lateral signal components in quadrature relation and corresponding to said pair of recordings, of a dual-channel signal translating circuit for controlling the relative amplitudes of said vertical and lateral signal components and balancing and equalizing said stereophonically-related signals, comprising in combination, impedance means having end terminals connected in shunt relation to said series-connected transducer elements, potentiometer means including a resistor element connected between the junction of said series-connected transducer elements and a movable intermediate point on said impedance means and having a contact element thereon, means providing an output connection for one channel of said translating circuit with one of said end terminals of said impedance means and said contact element, means providing a second output connection for the other channel of said translating circuit with the other of said end terminals of said impedance means and said contact element, said contact element being movable on said resistor element to balance the stereophonic signal output from both channels of said circuit, movement of the intermediate point on said impedance means varying the relative amplitudes of one of said signal components in both channels, and variable resistor means connected serially in circuit with each of said transducer elements for varying the relative amplitudes of the other of said signal components in both channels.

10. A signal translating circuit comprising the combination of a pair of signal sources providing stereophonically-related signals, a pair of output terminals, means connecting said pair of signal sources in series between said output terminals, first impedance means connected between said output terminals, second impedance means having a movable contact thereon connected between a point on said first impedance means and the connection between said pair of signal sources, a first output circuit connected between one of said output terminals and said movable contact, a second output circuit connected between the other of said output terminals and said movable contact.

References Cited in the file of this patent

UNITED STATES PATENTS

| | | |
|---|---|---|
| 2,114,471 | Keller et al. | Apr. 19, 1938 |
| 2,481,911 | De Boer et al. | Sept. 13, 1949 |
| 2,958,738 | Gray | Nov. 1, 1960 |

UNITED STATES PATENT OFFICE
CERTIFICATE OF CORRECTION

Patent No. 3,059,065 October 16, 1962

John A. Tourtellot

It is hereby certified that error appears in the above numbered patent requiring correction and that the said Letters Patent should read as corrected below.

Column 1, line 48, for "product" read -- produce --; column 5, line 30, for "elment" read -- element --; column 8, line 58, for "ohter" read -- other --; line 64, for "mainy" read -- mainly --; column 10, line 16, for "of lateral" read -- or lateral --; column 13, line 9, for "separated" read -- separate --; column 15, line 15, strike out "signal output", second occurrence.

Signed and sealed this 30th day of April 1963.

(SEAL)
Attest:

ERNEST W. SWIDER
Attesting Officer

DAVID L. LADD
Commissioner of Patents